Figure 1:
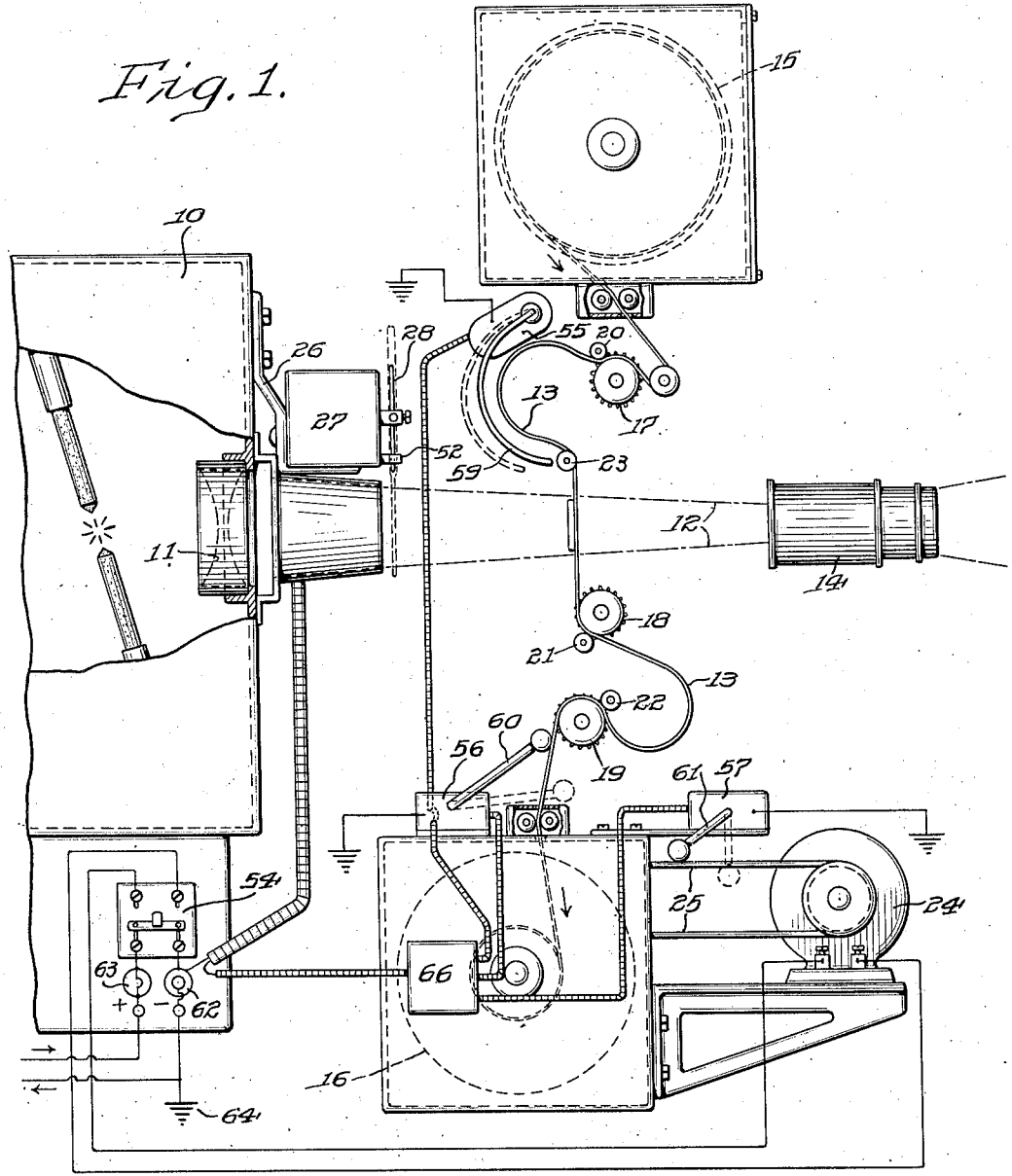

Dec. 10, 1929.   W. P. JEANES ET AL   1,738,999
MOTION PICTURE MACHINE
Filed July 6, 1927   3 Sheets-Sheet 1

INVENTORS
William P. Jeanes,
Chriss Drimmer,
BY Blount Hilbert,
ATTORNEYS

WITNESS
F. J. Hartman,

Dec. 10, 1929.   W. P. JEANES ET AL   1,738,999
MOTION PICTURE MACHINE
Filed July 6, 1927   3 Sheets-Sheet 2
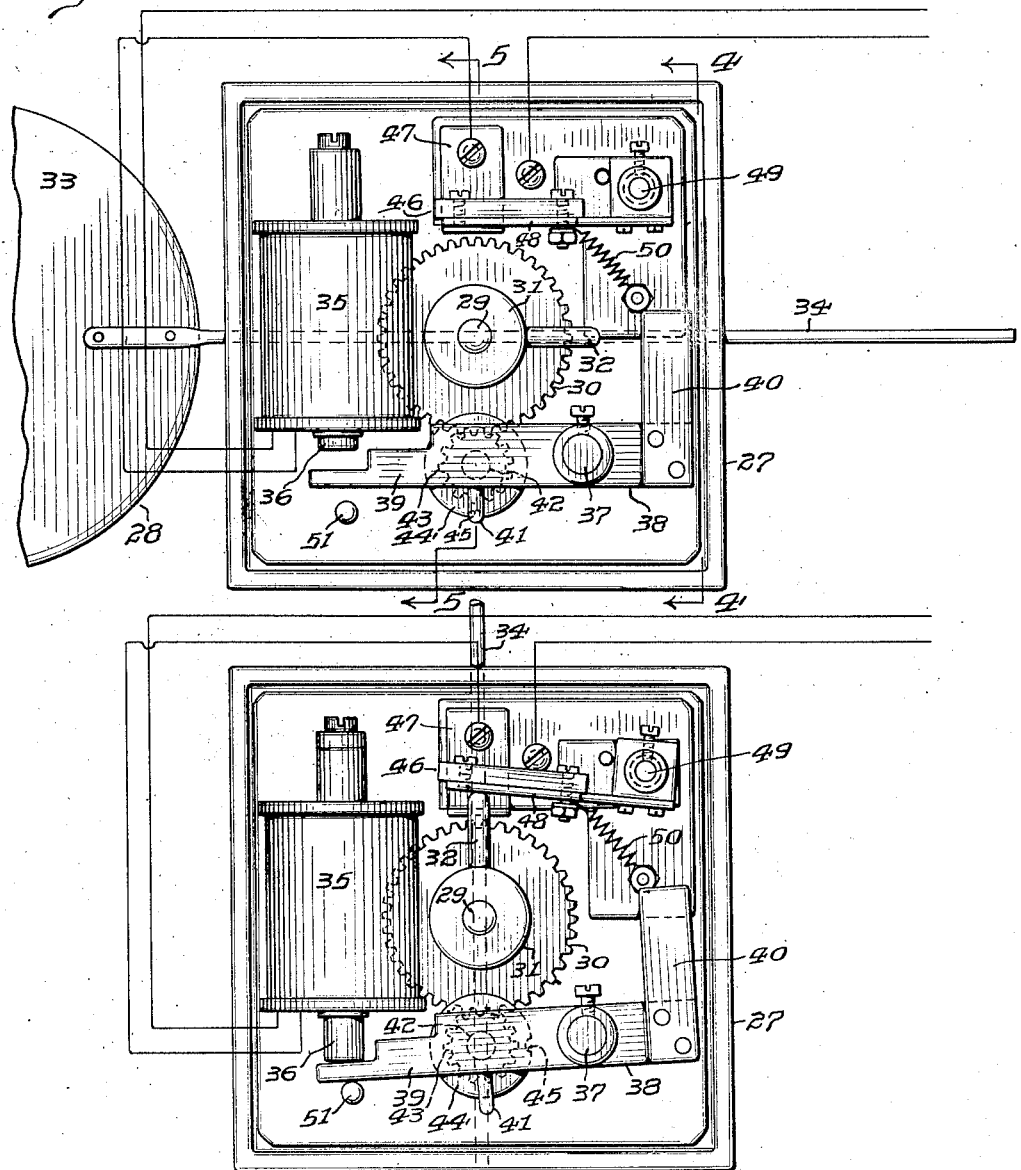
Fig. 2.
Fig. 3.
WITNESS
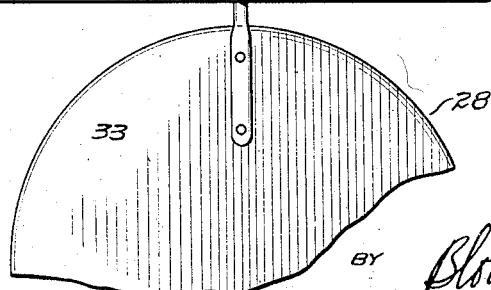
INVENTORS
William P. Jeanes,
Chriss Drummer.
BY
ATTORNEYS Dec. 10, 1929.  W. P. JEANES ET AL  1,738,999
MOTION PICTURE MACHINE
Filed July 6, 1927   3 Sheets-Sheet 3

WITNESS
F. J. Hartman.

INVENTORS.
William P. Jeanes,
Chriss Drimmer.
BY
ATTORNEYS

Patented Dec. 10, 1929

1,738,999

UNITED STATES PATENT OFFICE

WILLIAM P. JEANES AND CHRISS DRIMMER, OF PHILADELPHIA, PENNSYLVANIA

MOTION-PICTURE MACHINE

Application filed July 6, 1927. Serial No. 203,694.

This invention relates to improvements in safety devices for use in connection with motion picture machines and more particularly to a mechanism operable automatically to intercept the light rays at a point between the light source and the film upon the happening of certain contingencies.

It is a well known fact that from the standpoint of fire hazard a dangerous condition is presented when the film for any reason is interrupted in its free and continuous movement across the path of projection of the light rays from their source. A very short interval of time during which any portion of the film remains stationary in the path of the light rays is often sufficient to cause it to become ignited and so precipitate a fire in the projecting apparatus.

This dangerous condition may be caused by the happening of any one of the several contingencies, as for instance, breakage of the film at any point between its upper and lower reels, failure of the film to wind up properly on the lower reel, buckling of the film, or by breakage of the motor belt so that the film remains stationary in the path of projection of the light rays.

This invention aims to eliminate the danger of fire in the projecting apparatus when the film for any reason is interrupted in its free and continuous movement across the path of projection of the light rays and it is accordingly among the objects of this invention to provide a mechanism which is operable automatically to intercept the light rays upon the happening of any one or more of the contingencies such as have been above referred to.

A further object of the invention is the provision of a shield or "dowser" arranged to be thrown into position to intercept the rays of light which normally pass through the film in combination with mechanism operable to effect the opening of the motor circuit simultaneously as it intercepts the light rays.

A further object of the invention is the provision of a shield or dowser normally maintained to one side of the path of projection of the light rays but arranged to swing directly into said path when for any reason the film is interrupted in its free and continuous movement across said path of projection.

A still further object of the invention is the provision of an automatically operable device for intercepting the light rays emanating from their source at a point between said source and a motion picture film where the latter fails to feed properly across the path of projection of said light rays, said device being simple in construction and efficient and positive in operation.

A still further object of the invention is to provide a device of the character hereinbefore referred to which may be installed in any standard motion picture machine readily and with facility and without necessitating any change in the construction or in the operating arrangement of such machine.

Other objects of the invention will appear more fully hereinafter.

To enable those skilled in the art to comprehend and practice the invention we have illustrated in the accompanying drawings and will now proceed to describe certain embodiments of the invention as exemplified in connection with a typical motion picture machine, it being understood, however, that the invention is equally adapted for other uses and in other arrangements as will be well understood.

Figure 4:
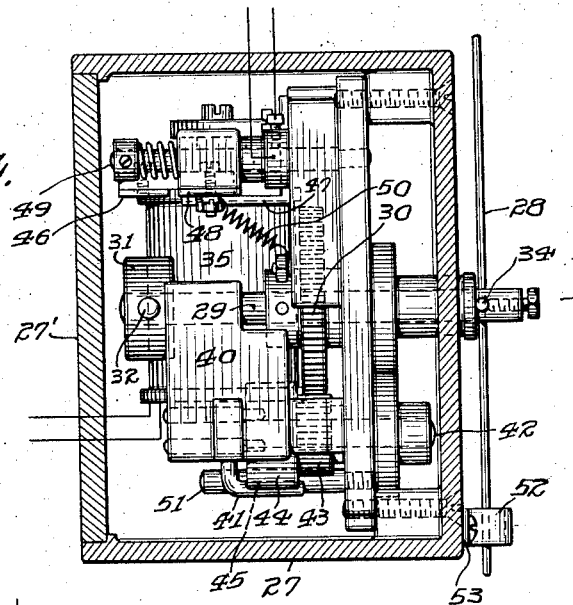
Figure 7:
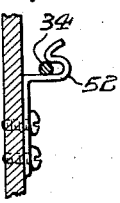
Figure 5:
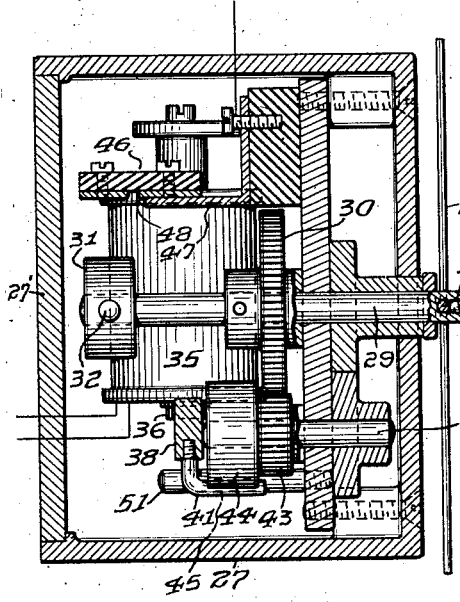
Figure 6:
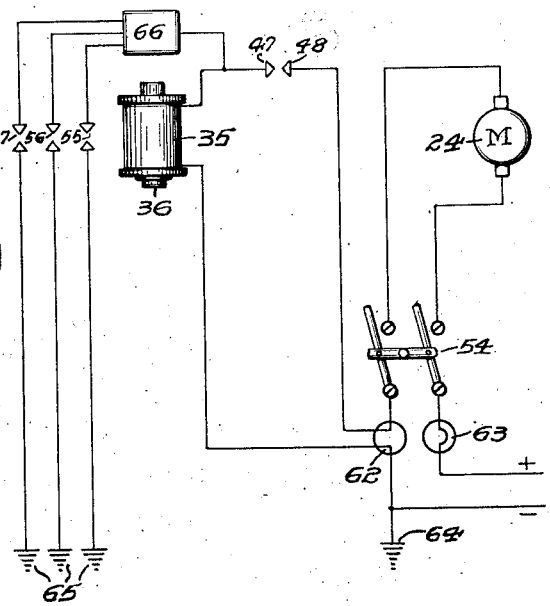

In said drawings Fig. 1 is a side elevational view showing generally a motion picture machine having operatively associated therewith an automatic light intercepting device constructed in accordance with one form of our invention, the electrical wiring connections therefor being shown more or less diagrammatically; Fig. 2 is a rear elevation of the light intercepting device with the rear wall of the casing removed showing the shield in inoperative position, that is, out of the path of projection of the light rays; Fig. 3 is a view similar to Fig. 2 but showing the shield in operative position to intercept the light rays and open the motor circuit; Fig. 4 is a cross-sectional view taken on the line 4—4 of Fig. 2; Fig. 5 is a cross-sectional view taken on the line 5—5 of Fig. 3; Fig. 6 is a wiring diagram of the electrical circuit relating to our invention, and Fig. 7 is a detail view showing the spring catch for maintaining the shield in operative position.

Referring more particularly to the drawings and especially to Fig. 1 thereof, it will be seen that the invention has been applied to a motion picture machine comprising the projector box 10 through the lens 11 of which is projected the light rays from the light source (as shown) located within the box. The path of these light rays is indicated generally by the lines 12. The film 13, which is intended for projection upon a suitable screen (not shown) traverses the path of projection of the light rays along a vertical line located between the lens 11 of the projector box and the outer lens box 14, which latter effects divergence of the light rays in the usual manner. Suitably disposed above and below the vertical line of movement of the film across the path of projection of the light rays are upper and lower film reels 15 and 16, respectively, the film being wound upon the lower reel 16 as the picture is being projected upon screen by means of suitably arranged toothed wheels 17, 18 and 19, the teeth of which engage suitable perforations in the edges of the film. Cooperating respectively with the toothed wheels 17, 18 and 19 are guide rollers 20, 21 and 22 and supplementing these rollers are additional rollers, such as 23, for causing the film to follow the path of movement as shown in Fig. 1. A motor 24, through the belt 25, drives the lower reel 16 and so causes the film to travel across the path of projection of the light rays. As the several parts to which reference has just been made are commonly found in one form or another in the various types of projecting apparatus in general use, further description thereof would be superfluous.

In accordance with our invention we mount upon the motion picture apparatus in any suitable manner, but preferably by the bracket 26 secured upon the forward face of the projector box, a casing 27 having a removable cover 27' within which casing is housed the mechanism for effecting operation of a shield or dowser 28 arranged to be thrown across the path of projection of the light rays to the rear of the film when continuous and unbroken movement of the latter across said path of projection fails for any reason.

Before referring to the electrical circuit connections to or the method of operation of this dowser operating mechanism, the construction of the latter will first be described. Extending through an aperture in the forward wall of the casing 27 is a shaft 29, the portion thereof projecting within the casing having fixed thereon a gear 30 and a collar 31, which latter is provided with a radially projecting pin or finger 32. Upon the end of the shaft which extends outwardly of the casing, is secured the dowser 28 which latter preferably consists of a circular disk 33 carried upon a stem or rod 34. As clearly appears in Figs. 2 to 5, inclusive, the free end of this stem 34 projects beyond the plane of the side wall of the casing 27 for a purpose which will appear more fully hereinafter. Mounted within the casing 27 is a solenoid 35 provided with a vertically operable plunger 36, and pivotally supported, as at 37, is a lever 38 of substantially L-shape, the free end of the longer arm 39 of which extends to a point beneath the lower end of the plunger 36. The shorter arm 40 of the lever is weighted and serves as a counterweight to normally overbalance the weight of the lever arm 39.

Carried by the lever arm 39 is a clutch pin 41 extending transversely across the bottom of the arm. Upon a stub shaft 42 paralleling the main shaft 29 and lying in the same vertical plane therewith, is mounted for rotation a gear 43 arranged to mesh with the gear 30. Also carried by the stub shaft 42 and arranged to rotate with the gear 43 is a clutch collar 44 having a notch 45 in its circumferential surface. With the dowser disk 33 in the position shown in Fig. 2, that is, in inoperative position, the notch 45 will be directed downwardly and the clutch pin 41 will be seated therein due to the fact that the weighted arm 40 will have caused the lever arm 39 to be lifted upwardly. In this position of the dowser the solenoid plunger 36 will be in retracted position.

Also mounted within the casing 27 and above the gear 30 is a switch 46 for controlling the motor circuit, this switch comprising a fixed contact 47 and a relatively movable contact finger 48 pivoted as at 49. A spring maintains the contact finger normally in contact with the fixed contact 47. It will be observed that when the lever 38 is caused to rotate about its pivot 37 so as to disengage the clutch pin 41 from the notch 45 in the clutch collar the dowser disk 33 will be permitted to drop by its own weight to the operative position shown in Fig. 2, thereby causing the radially extending pin 32 to rotate in a counter-clockwise direction to lift the contact finger 48 away from the fixed contact 47 with the result that the motor circuit is opened and further feeding of the film across the path of projection of the light rays is immediately arrested. Downward movement of the free end of the lever arm 39 is limited by a suitably provided stop 51, while a spring catch 52 supported, as at 53, upon the outside of the casing 27 and in the path of movement of the dowser rod or stem 34 prevents the dowser from swinging beyond or springing back from its operative position.

Referring again to Fig. 1 and also to Fig. 6 showing the wiring connections relating to the dowser operating mechanism, it will be seen that the switch 46 and the solenoid 35 are connected in series with each other and with the motor 24 so that upon closing the main power switch 54 and with the dowser disk in raised and out-of-operative position, the solenoid 35 will be energized and the plunger 36 will be accordingly maintained in retracted position. Should the solenoid 36 for any reason become deenergized, it will be apparent that the plunger 36 will then drop and in so doing will force the lever arm 39 downwardly to effect disengagement of the clutch pin from the clutch collar 44. The gear 43 will then cease to have any retarding effect upon the gear 30 whereupon the latter will be free to permit the dowser disk 33 to drop, due to its own weight, into a position to intercept the rays of light emanating from the projector box. At the same time that the dowser disk drops the pin 32 will be rotated in a counter-clockwise direction to separate the switch elements 47 and 48 and so effect the opening of the motor circuit.

It now remains to describe the means for deenergizing the solenoid 35. As is shown more or less diagrammatically in Figs. 1 and 6, there are provided a plurality of switches such as 55, 56 and 57 located at different points in the machine. These switches 55, 56 and 57 which may be of greater number than shown in the drawings or arranged in other locations as may be desired, are each provided with an operating lever, in the instances shown with levers 59, 60 and 61 respectively. When the switches 55, 56, 57 are opened the levers 59, 60, 61 respectively are in the positions indicated by the full lines. When, however, the levers assume the positions shown by the dotted lines, the switches have been closed. The dowser operating mechanism including the solenoid 35 and the switch 46 are connected into the motor circuit, preferably in the negative side of the line by a suitable plug or adapter 62, the positive side of the line being protected by the usual fuse plug 63. The negative side of the line is grounded as at 64 while one terminal of each of the switches 55, 56, 57 is likewise grounded as at 65. The opposite terminals of these switches are connected to the fixed contact 47 of the motor circuit switch 46 through a common junction box 66. It will thus be seen that when one or more of the switches 55, 56, 57 are closed for any reason a path is provided for the current to pass through the ground, thereby shunting the solenoid 35 and effecting its deenergization.

The operation of the dowser mechanism should now be apparent. In the event that the film 13 should break before it reaches the first sprocket 17, no more of the film will be fed from the upper reel 15. The lower portion of the film will, however, continue to run through the sprockets 18 and 19 while it is being wound upon the lower reel, but as soon as the broken end of the film passes the last sprocket 19 the lever 60 will immediately drop and so close the switch 56, thereby shunting the solenoid 35. The latter is thus deenergized whereupon the plunger 36 drops upon the free end of the lever arm 39, thereby permitting the dowser disk to drop simultaneously as the switch 46 is opened to stop the motor.

A similar action would take place in the event of failure of the film to wind up properly upon the lower reel 16. Or should the belt 25 break and so cause the machine to stop thus leaving the film in stationary position, the weighted lever 61 will immediately drop with the result that the dowser disk will drop and the motor circuit be interrupted in the same manner as has already been described. Also it will be obvious that should the film break at a point between the sprockets 18 and 19 so that the portion of the film above the break continues to be fed through the sprocket 18, the portion thereof below the break will pass beyond the sprocket 19 and so permit the lever 60 to drop, thus causing the dowser disk to drop at the same time the motor circuit is opened. It will be understood that the switches 55, 56, 57 and their respective operating levers 59, 60, 61 may be altered in design and shifted in position as may be desired to provide the necessary means for causing the dowser disk to drop into operative position simultaneously as the motor circuit is opened upon the happening of any contingency affecting the continuous and free movement of the film across the path of projection of the light rays.

While we have herein described and illustrated certain embodiments of our invention with considerable particularity, we do not thereby desire or intend to limit or confine ourselves specifically thereto, nor is it our intention to restrict the use of the invention solely to machines such as have been herein described, as suitable modifications may, if desired, be made in the design, construction and arrangement of the various parts of the invention whereby it may be utilized for purposes other than that to which we have referred without departing from the spirit and scope of the invention as defined in the appended claims.

Having thus described our invention we claim and desire to protect by Letter Patent of the United States:

1. A light intercepting attachment for motion picture machines and the like including a motor controlling switch, a shaft spaced from the switch and having a member movable into and out of engagement with the switch by the rotation of the shaft to operate the switch, a douser mounted on and adapted to automatically rotate the shaft, a second shaft geared to the first shaft, a clutch connected with the second shaft for holding the said shafts against rotation, and means for operating the clutch to release the shafts.

2. A light intercepting attachment for motion picture machines and the like including a motor controlling switch, a shaft spaced from the switch and having a member movable into and out of engagement with the switch by the rotation of the shaft to operate the switch, a douser mounted on and adapted to automatically rotate the shaft, a second shaft geared to the first shaft, a clutch connected with the second shaft for holding the said shafts against rotation, a gravity acting plunger arranged to operate the clutch to release the shafts, and electrically controlled means for supporting the plunger in an elevated position and for releasing the said plunger.

3. A light intercepting attachment for motion picture machines and the like including a motor controlling switch, a shaft spaced from the switch and having a member movable into and out of engagement with the switch by the rotation of the shaft to operate the switch, a douser mounted on and adapted to automatically rotate the shaft, a second shaft geared to the first shaft, a rotary clutch member carried by said second shaft, a gravity acting lever engaging the rotary clutch member for holding said shafts against rotation, and means for releasing the rotary clutch member.

4. A light intercepting attachment for motion picture machines and the like including a motor controlling switch, a shaft spaced from the switch and having a member movable into and out of engagement with the switch by the rotation of the shaft to operate the switch, a douser mounted on and adapted to automatically rotate the shaft, a second shaft geared to the first shaft, a rotary clutch member carried by said second shaft, a weighted lever engaging the rotary clutch member to hold the shafts against movement, a gravity acting plunger arranged to engage the lever to release the rotary clutch member, and means for supporting the plunger in an elevated position and for releasing the same.

5. A light intercepting attachment for motion picture machines and the like including a motor controlling switch, a shaft spaced from the switch and having a member movable into and out of engagement with the switch by the rotation of the shaft to operate the switch, a douser mounted on and adapted to automatically rotate the shaft, a second shaft geared to the first shaft, a rotary clutch member carried by said second shaft, a weighted lever engaging the rotary clutch member to hold the shafts against movement, and a solenoid having a gravity acting plunger and adapted when energized to support the plunger in an elevated position and when de-energized to release the plunger.

In witness whereof, we have hereunto set our hands this 30th day of June, 1927.

WILLIAM P. JEANES.
CHRISS DRIMMER.